(12) United States Patent  
Chambrion et al.

(10) Patent No.: US 9,193,009 B2  
(45) Date of Patent: Nov. 24, 2015

(54) CLUTCH HAVING A PRE-CLUTCH AND A MAIN CLUTCH

(71) Applicant: Schaeffler Technologies AG & Co. KG, Herzogenaurach (DE)

(72) Inventors: Martin Chambrion, Herrlisheim (FR); Christoph Raber, Ottweiler-Steinbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/959,133

(22) Filed: Aug. 5, 2013

(65) Prior Publication Data

US 2013/0313061 A1   Nov. 28, 2013

Related U.S. Application Data

(63) Continuation of application No. PCT/DE2012/000063, filed on Jan. 27, 2012.

(30) Foreign Application Priority Data

Feb. 8, 2011   (DE) .......................... 10 2011 010 692  
Mar. 24, 2011   (DE) .......................... 10 2011 015 059

(51) Int. Cl.
| | |
|---|---|
| *F16D 13/38* | (2006.01) |
| *F16D 13/04* | (2006.01) |
| *B23K 26/38* | (2014.01) |
| *F16D 13/54* | (2006.01) |

(52) U.S. Cl.  
CPC .............. *B23K 26/385* (2013.01); *F16D 13/04* (2013.01); *F16D 13/38* (2013.01); *F16D 13/54* (2013.01)

(58) Field of Classification Search  
CPC ....................................................... F16D 13/42  
See application file for complete search history.

(56) References Cited

U.S. PATENT DOCUMENTS

| | | | |
|---|---|---|---|
| 4,645,049 A | 2/1987 | Matsuda et al. | |
| 5,355,981 A * | 10/1994 | Itoh et al. | ........................ 192/35 |
| 5,687,821 A * | 11/1997 | Lorriette | ...................... 192/52.4 |
| 5,967,276 A * | 10/1999 | Leichliter et al. | ................ 192/35 |
| 6,233,999 B1 * | 5/2001 | Yabutani et al. | ............. 72/354.8 |
| 6,786,317 B2 * | 9/2004 | Matsufuji et al. | ........ 192/48.611 |
| 7,650,973 B2 * | 1/2010 | Tsukamoto et al. | ........... 192/3.3 |
| 2001/0011622 A1 | 8/2001 | Arai et al. | |
| 2005/0167229 A1 | 8/2005 | Tsukada et al. | |

FOREIGN PATENT DOCUMENTS

GB   2251465 A   7/1992

* cited by examiner

*Primary Examiner* — Ramya Burgess  
*Assistant Examiner* — Mark Manley  
(74) *Attorney, Agent, or Firm* — Simpson & Simpson, PLLC

(57) ABSTRACT

A clutch having a pre-clutch and a main clutch, where the pre-clutch can be brought to an engaged or a disengaged state by a tensioning means, the pre-clutch being connected to the main clutch by means of an operative connection in such a way that the disengaged position and the engaged position are transmitted to the main clutch, and where the tensioning means is supported on a clutch basket of the main clutch.

12 Claims, 7 Drawing Sheets

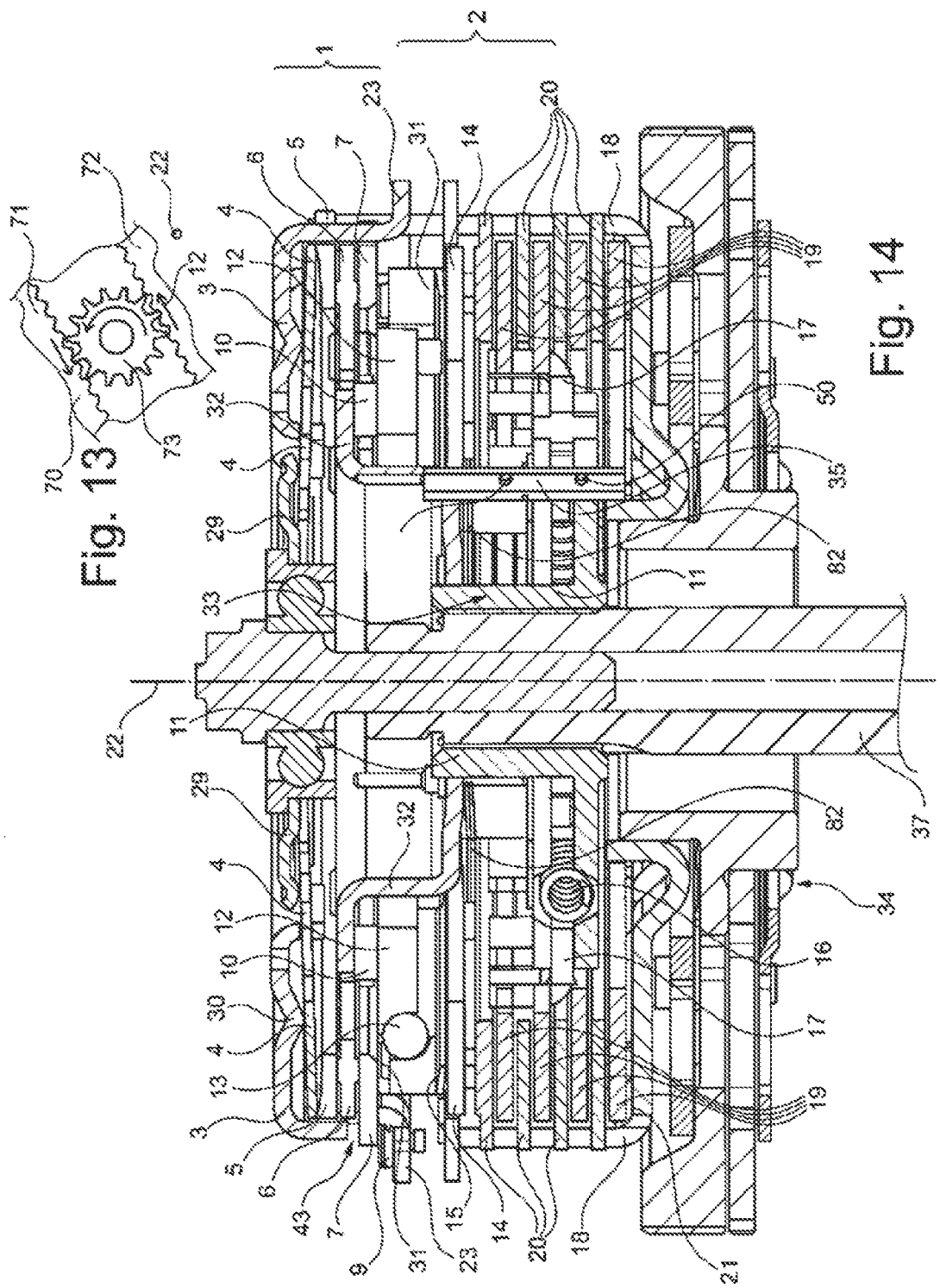

CLUTCH HAVING A PRE-CLUTCH AND A MAIN CLUTCH

CROSS-REFERENCE TO RELATED APPLICATIONS

This patent application is filed pursuant to 35 U.S.C. §120 and §365(c) as a continuation of International Patent Application PCT/DE2012/000063 filed Jan. 27, 2012 which application claims priority from German Patent Application No. 10 2011 010 692.8, filed Feb. 8, 2011, and German Patent Application No. 10 2011 015 059.5, filed Mar. 24, 2011, which applications are incorporated herein by reference to their entireties.

FIELD OF THE INVENTION

The invention relates to a clutch having a pre-clutch (1) and a main clutch.

BACKGROUND OF THE INVENTION

So-called booster clutches with torque sensors are known from the patent applicant. Clutches of this type are used to be able to transmit high torques with low actuating forces of the clutch. To that end, the booster clutches enable a reduction in the actuating energy, and offer a limitation of the drag torque (anti-hopping function).

BRIEF SUMMARY OF THE INVENTION

The object of the present patent application is to provide an improved clutch.

One advantage of the proposed clutch is that the dynamic sensitivity of the clutch is improved. This is achieved by the fact that the tensioning means for the pre-clutch is supported on the clutch basket of the main clutch.

In another embodiment, the means of operative connection between the pre-clutch and the main clutch is connected to the clutch core through spring means. In this way, the manner of operative connection, in particular the pressure plate, is centered.

In another embodiment, ramps of the operative connection are pre-tensioned. This achieves an improved and faster transfer of the engagement or disengagement of the pre-clutch to the main clutch.

In another embodiment, a driver disk is provided in the pre-clutch, which is connected to the clutch basket of the main clutch in a rotationally fixed connection and is pre-tensioned by means of additional spring elements. This suppresses the vibrations of the pre-clutch that arise due to fluctuations in the transmissible torque of the clutch. Providing the additional spring elements realizes a resiliency in the lining of the pre-clutch, thus improving the progressive transmission of torque.

In another embodiment, a torque sensor is situated between the clutch core and an internal clutch core of the main clutch. In this way, an improved dynamic connection is achieved between the core of the clutch and the main clutch; this reduces the tendency of the clutch to vibrate, in particular the tendency of the clutch to catch.

In another embodiment, the main clutch has a clutch basket that is designed as a punched part, which enables a cost-effective production.

In addition, a protective ring is provided to stabilize the clutch basket; the ring surrounds the clutch basket and protects the clutch basket, in the form of a punched part, against breaking.

In another embodiment, the driver disk has outward-projecting cogs which are inserted into cutouts in a cover of the pre-clutch. The lateral faces of the cutouts serve as a stop face when a modulation phase of the second spring elements is ended.

In another embodiment, tubes are provided in the clutch. These are used to carry oil to lubricate the clutch. Preferably, the tubes are oriented parallel to an axis of symmetry, and have, for example, lateral openings to emit oil. This enables a defined and precise conveyance of the lubricating oil stream.

In another embodiment, the pre-clutch and the main clutch are coupled together by means of a centrifugal clutch. For example, the centrifugal clutch may be provided between the cover of the pre-clutch and the clutch basket of the main clutch. In this way, the cover is not moved along with the clutch basket until the centrifugal clutch is engaged.

In another embodiment, an equalizing mass is provided which is coupled with the effective medium between the pre-clutch and the main clutch and enables damping of the vibrations of the effective medium.

In another embodiment, the equalizing mass is connected to a ramp of the effective medium, a gear wheel system being provided for coupling between the equalizing mass and the ramp. The coupling occurs by the ramp driving the equalizing mass in an opposing direction. In this way, vibrations of the ramp are damped by the equalizing mass. That makes the effective medium less sensitive to excitation from vibrations. For example, if the pilot clutch is connected to a motor, then the equalizing mass offers an improvement to the insensitivity of the clutch to throttle bursts, i.e., brief changes in torque from the motor. In this way, brief torque spikes at the input of the pre-clutch are damped, so that engagement of the pre-clutch and thus engagement of the main clutch is prevented. In addition, the equalization mass makes it possible to reduce catching problems of the clutch when driving off.

BRIEF DESCRIPTION OF THE DRAWINGS

The invention will be explained in greater detail below on the basis of the figures. The figures show the following:

FIG. 13 is a schematic view of the gear wheel;

FIG. 14 is another cross section through the clutch from FIG. 3; and,

DETAILED DESCRIPTION OF THE INVENTION

Figure 1:
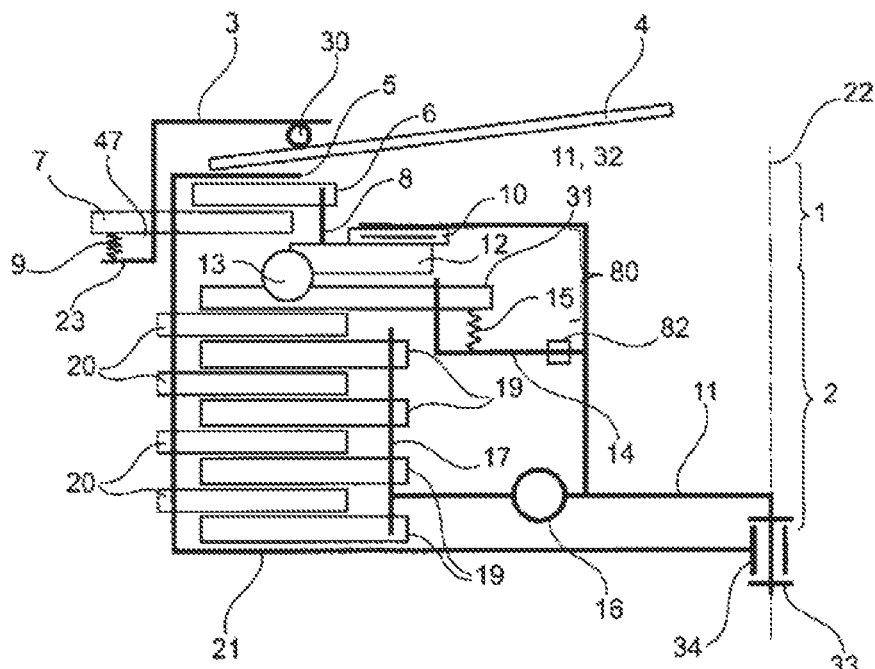
FIG. 1 illustrates a first embodiment of the clutch with the pre-clutch pressure-engaged.

FIG. 1 shows a schematic partial view of a first embodiment of a clutch. The figure shows a schematic view of half of the clutch in reference to a center axis 22. The parts depicted in FIG. 1 are designed rotationally symmetrical to the center axis 22. The clutch has a pre-clutch 1, which is connected to the main clutch 2 through an effective medium 80. The pre-clutch 1, the main clutch 2 and the effective medium 80 are designed in such a way that a disengaged position and an engaged position of the pre-clutch are transmitted to the main clutch. In this way, only actuation of the pre-clutch is necessary in order to simultaneously disengage or engage the main clutch. This reduces the actuating forces to disengage or engage the clutch.

The clutch has a clutch core 11, which is connected to a first connection 33. In the depicted embodiment, the first connection 33 is connected to a transmission output shaft. The clutch core 11 has a pressure plate 14, in which a second ramp 31 is held so that it is rotationally fixed but is movable in the axial direction of the center axis 22. Depending on the chosen embodiment, a second spring means 15 is provided which pre-tensions the second ramp 31 in the direction of an assigned first ramp 12. Situated between the second ramp 31 and the first ramp 12 is a ball 13 in the form of a transmitting element. The two ramps 12, 31 and the ball 13 form the effective medium The first ramp 12 is supported so that it is displaceable parallel to the center axis 22, and opposite the second ramp 31 it is supported on a bearing 10. Opposite the first ramp 12, the bearing 10 is braced against a core part 32. The first ramp 12 is connected through a connecting means 8 to a plate 6, which is situated bordering on an upper support plate 5 of a clutch basket 18 of the main clutch 2. Opposite the support plate 5 a driver disk 7 is provided, which is axially movable along the center axis 22 and inserted non-rotatingly in the clutch basket 18. Also provided is a cover 3, which is situated at the upper end area of the clutch basket 18. The cover 3 is of essentially L-shaped design, and overlaps the support plate 5 and an upper lateral end area of the clutch basket 18. In addition, the cover 3 has a laterally opposed cover rim 23, which is formed beneath the driver disk 7. Between the cover rim 23 and the driver disk 7 a first spring means 9 is formed, which pre-tensions the driver disk 7 in the direction of the plate 6.

Situated as a tensioning means between the support plate 5 and the cover 3 is a diaphragm spring 4, which is braced on the support plate 5 in an end area and fits against a support 30 of the cover 3. The depicted clutch represents a pressure-engaged clutch.

The core 11 is connected to an inner clutch basket 17 of the main clutch through a torque sensor 16, which is in the form of a coil spring. Plates 19 are held in the inner clutch basket 17. The plates 19 are held in the inner basket 17, non-rotatingly with respect to the inner basket 17 and parallel to the center axis, and movable axially with respect to the center axis 22. Situated between each two disks 19 is a driver disk 20, which is situated non-rotatingly with respect to the clutch basket 18 and axially movable with respect to the center axis 22. A driver disk 20 is situated between the second ramp 31 and a topmost plate 19. The clutch basket 18 is connected to a second connection 34 by means of a floor plate 21. The second connection 34 is connected to a crankshaft of an engine.

The effective medium, which comprises the first ramp 12, the transmission element 13 and the second ramp 31, is designed in such a way that twisting the two ramps 12, 31 against each other results in the second ramp 31 being pressed downward, and thereby pressing the driver disks 20 and the plates 19 together and thus engaging the main clutch. To that end, appropriately inclined ramp surfaces are formed. Depending on the embodiment chosen, there may also be only one ramp 12, 31 that has an inclined ramp surface. Movement of the two ramps 12, 31 does not take place if the pre-clutch is disengaged, as in this case the ramps are not twisted against each other. But if the pre-clutch is engaged, then the end of the diaphragm spring 4 braces against the support plate 5 and presses the cover 3 upward by means of the support 30. This causes the driver disk 7, which is braced against the cover 3 in the axial direction by means of a support surface 47, to be pressed upward against the plate 6. At the same time, the support plate 5 is pressed against the plate 6 by the diaphragm spring 4. Thus a frictional engagement is achieved between the plate 6 and the driver disk 7. Consequently the plate 6 is moved along with the rotary motion of the disk 7. Thus the first ramp 12 is also set in rotary motion opposite the second ramp 31 through the connecting means 8. This causes the ball 13 to be pressed downward by the ramp surfaces in the direction of the second ramp 31. Consequently, the second ramp 31 presses the driver disks 20 and the plates 19 together. Thus the main clutch 2 is engaged.

In the disengaged state of the pre-clutch 1, no twisting of the plate 6 and thus of the first ramp 12 opposite the second ramp 31 takes place. Therefore, when the pre-clutch 1 is disengaged, the main clutch 2 is also disengaged.

Through the arrangement of the first spring means 9, which pre-tensions the driver disk 7 against the plate 6, vibrations can be suppressed in the pre-clutch. The cover 3 in the depicted embodiment is axially movable with respect to the clutch basket 18, but is non-rotatingly connected to the clutch basket 18.

Pre-tensioning of the second ramp 31 in the direction of the first ramp 12 is achieved by arranging the second spring means 15. As a result, the ramps are always frictionally locked, therefore resulting in a quick transmission of a relative rotation of the two ramps against each other. Depending on the chosen embodiment, leaf spring packages or compression springs, for example, may be employed to form the second spring means. In addition, the pressure plate and the ramp can be centered by means of the leaf springs or compression springs. This enables a precise alignment of the pressure plate and the ramp center-symmetrical to the center axis 22.

The arrangement of the first spring means 9 enables lining resiliency of the plate 6 and driver disk 7 of the pre-clutch, so that progressive transfer of torque is possible. In another design, a third spring means 82 is provided, with which the pressure plate 14 is connected to the core 11.

Figure 2:
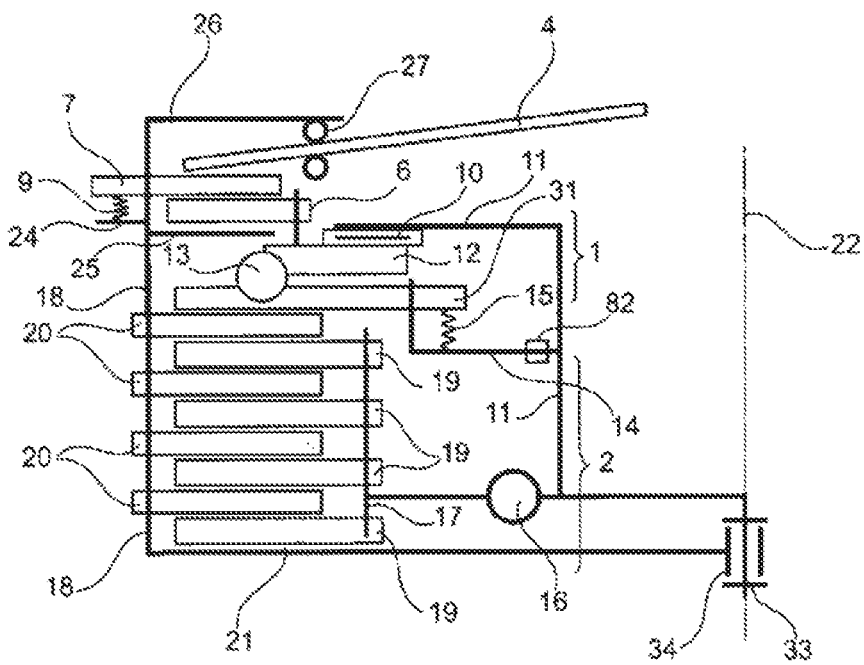
FIG. 2 illustrates a second embodiment of the clutch with the clutch pressurized.

FIG. 2 shows another embodiment, in which the main clutch 2 is designed in accordance with the configuration of FIG. 1. Differences in the two embodiments arise in the design of the pre-clutch 1. A separate cover is not provided in FIG. 2, but rather the diaphragm spring 4 is supported on a bearing 27 on a cover plate 26 of the clutch basket 18. In addition, an outer end of the diaphragm spring 4 is in operative connection with the driver disk 7, which is situated above the plate 6 in the exemplary embodiment. The plate 6 rests on a second basket flange 25, which is connected to the clutch basket 18. In addition, a first basket flange 24 is formed outside of the clutch basket 18. The first spring means 9 is clamped between the first basket flange 24 and the driver disk 7. Lining resiliency of the pre-clutch 1 is again achieved thereby. The clutch depicted in FIG. 2 represents a clutch under pressure. Otherwise, the operating principle is the same as the operating principle of the clutch in FIG. 1.

Figure 3:
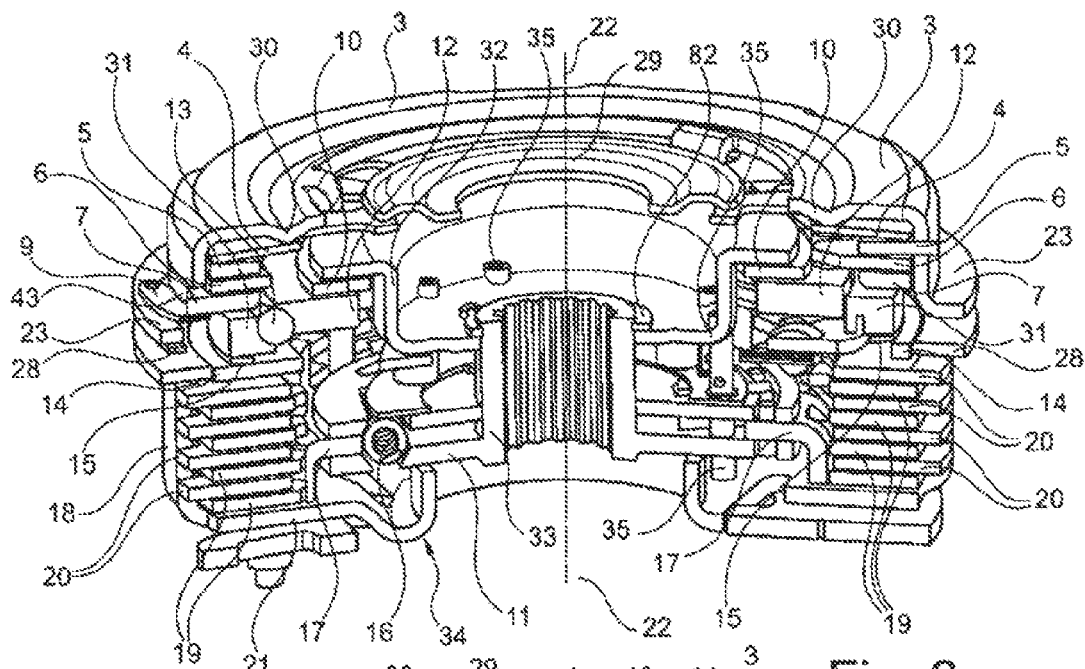
FIG. 3 is a cross-sectional view of the embodiment of FIG. 1.

FIG. 3 shows a cross section through a perspective view of the clutch from FIG. 1.

FIG. 3 clearly shows the design of the clutch core 11, which is connected on one side to the first connection 33 and on the other side through the torque sensor 16 to the inner clutch basket 17. To actuate the diaphragm spring 4 an actuating ring 29 is provided, which rests on inner strap ends of the diaphragm spring 4. In addition, a core part 32 is depicted, which is connected to the first connection 33 and also serves as a mounting surface for the bearing 10. The core part 32 is of pot-shaped design, and an upper, outward-projecting area of it rests on the bearing 10. The bearing 10 is in the form of a needle bearing, for example. Visible in the left side of the depiction is a cross section through the ball 13 and the two ramps 12, 31. In the depicted embodiment, the second spring means 15 is designed in the form of a diaphragm spring. The diaphragm spring is situated in the outer edge area of the second ramp 31, and is clamped between the second ramp 31 and the pressure plate 14.

In the depicted embodiment, the second spring means 9 is designed in the form of a leaf spring, which is clamped between the cover rim 23 and the driver disk 7. To that end, lugs of the driver disk 7 project through lateral second openings 43 in the cover 3.

It can also be seen that the pressure plate 14 is connected to the clutch core 11 through the third spring means 82. The third spring means are designed in the form of leaf springs. In addition, tubes 35 are provided to carry lubricating oil.

It is also recognizable that the driver disks 20 engage cutouts in the clutch basket 18 with external end pieces. Furthermore, the clutch basket 18 is surrounded in an upper area by a guard ring 28. The guard ring 28 ensures that the clutch basket 18 cannot break. This is particularly advantageous if the clutch basket 18 is made from a punched part.

Figure 4:
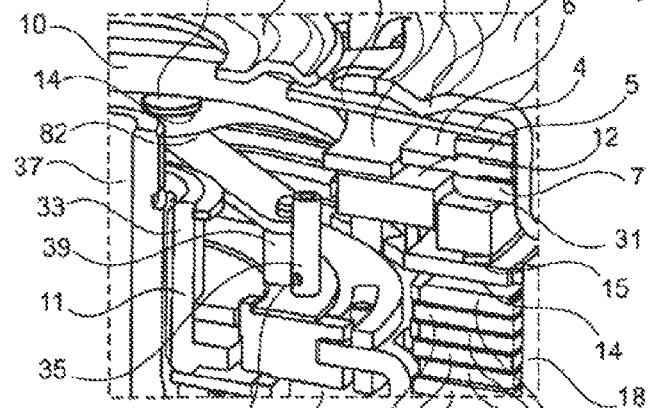
FIG. 4 is a detail view of the connection of the pressure plate with the clutch core.

FIG. 4 shows a detail view of the depiction in FIG. 3. A connection region 38 of the pressure plate 14 is depicted, which is guided inward until it is above the clutch core 11. The connection region 38 is connected to a bolt 39 of the clutch core by means of a third spring means 82 made in the form of a leaf spring. To attach the stop plate, three such attaching devices, for example, are provided. This causes the stop plate to be centered, non-rotatingly connected to the core 11, and spring-supported in addition. The depicted design shows a gear shaft 37, which is coupled with a first connection 33 of the clutch core 11. Also recognizable is the tube 35, which is situated parallel to the center axis 22 and has at least one lateral opening 50. In the interest of clarity, the core part 32 is not depicted in FIG. 4.

Figure 5:
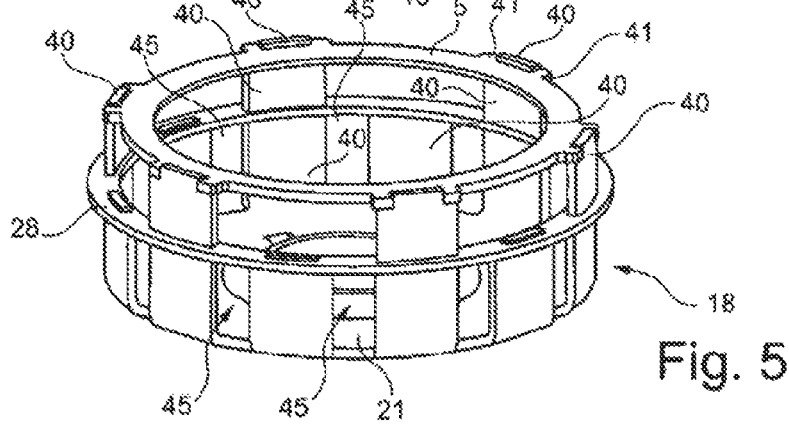
FIG. 5 is a perspective view of the clutch basket of the version shown in FIGS. 1 and 3.

FIG. 5 shows the clutch basket 18 with floor plate 21. The clutch basket 18 has the floor plate 21 and spaced side walls 40. Third openings 45 are formed between the side walls 40. The side walls 40 are alternated until a center or until the upper end region. Situated in the center is the guard ring 28, which protects the side walls 40 against bending open. Situated in the upper end region of every second side wall 50 is the support plate 5. The support plate 5 has webs 41, which are firmly connected to the side walls 40. This makes a cost-effective and robust form of the clutch basket 18 possible. The clutch basket 18 is made as a punched part, and is nevertheless sturdy due to the guard ring 28.

Figure 6:
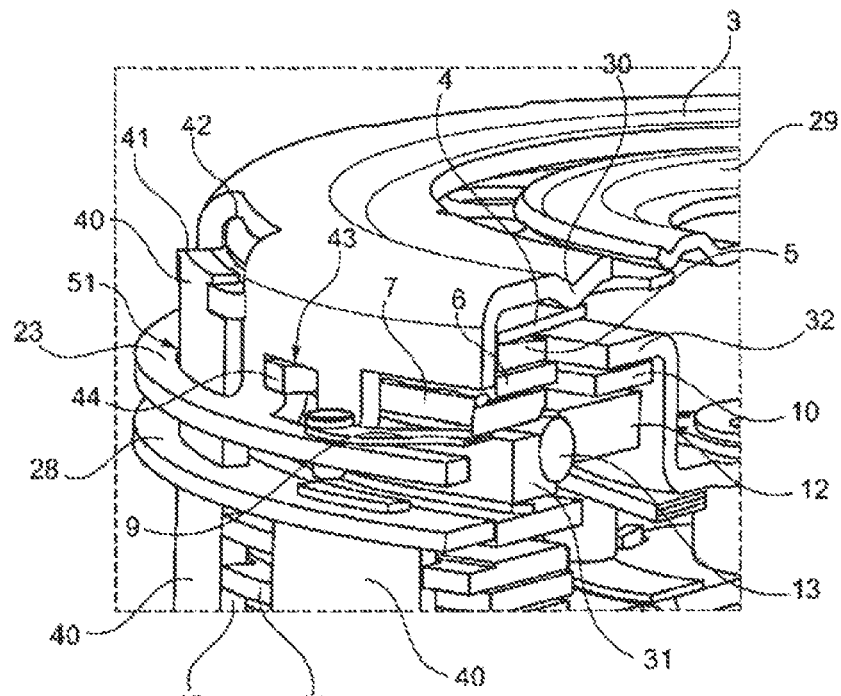
FIG. 6 is another detail view of the embodiment of FIG. 3.

FIG. 6 shows a detail view of FIG. 3. Clearly visible here are the second openings 43 in the side wall of the cover 3, into which cogs 44 of the driver disk 7 project. It can also be seen that the side walls 40 project through guide openings 51 of the cover 23. The webs 41 are also guided through openings 42 in the upper corner area of the cover 3. Also shown are second cogs 46 of the driver disks 20, which project into third openings 45 of the clutch basket 18.

Figure 7:
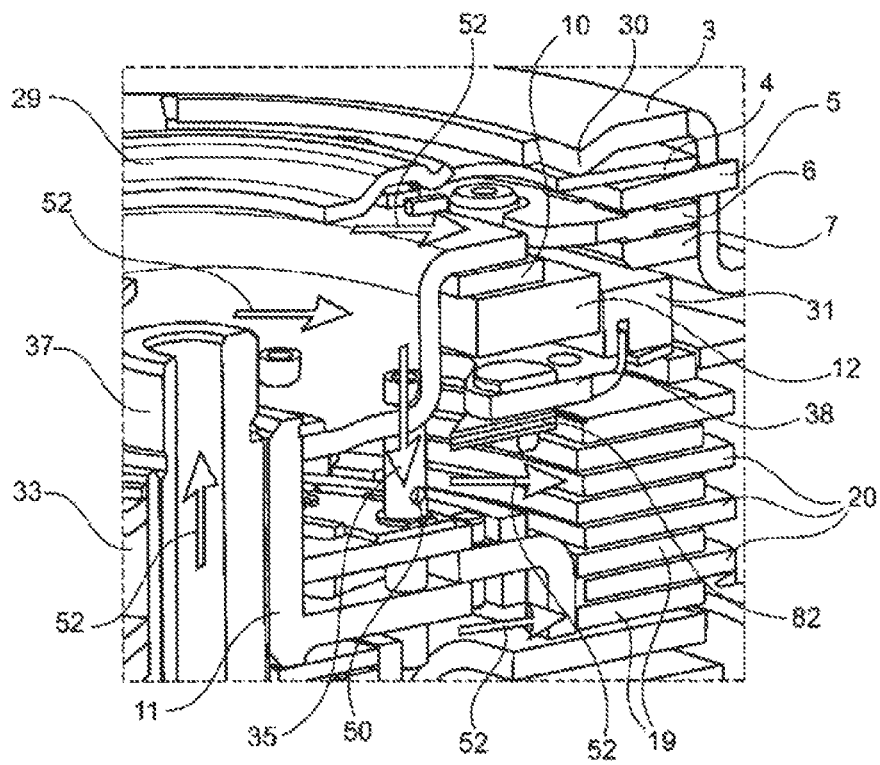
FIG. 7 is a detail view of the lubrication system of the embodiment of FIG. 3.

FIG. 7 shows another detail view of FIG. 3 to explain the advantageous lubrication system. The lubricating oil is delivered for example through the gear shaft 37. The flow of lubricating oil is depicted schematically by means of arrows 52. A plurality of tubes 35 are provided, which are preferably situated parallel to the center axis 22 in the clutch, in order to distribute lubricating oil on prescribed paths. The tubes 35 are conducted through various components of the clutch core, and distribute the stream of lubricating oil in various levels of the clutch. The oil comes from the transmission input shaft, and is connected, for example, in the region that supports the bearing 10. From there the lubricating oil is conducted downward through the tubes into deeper regions. The tubes 35 have lateral openings 50 for the distribution, so that lubricating oil can also be dispensed between an input and an output of the tube 35. The oil is therefore distributed onto the various friction surfaces. Depending on the chosen embodiment, the tubes can also be bent or oriented in other angular directions. FIG. 7 also shows a section of the connection region 18 of the pressure plate 14.

Figure 8:
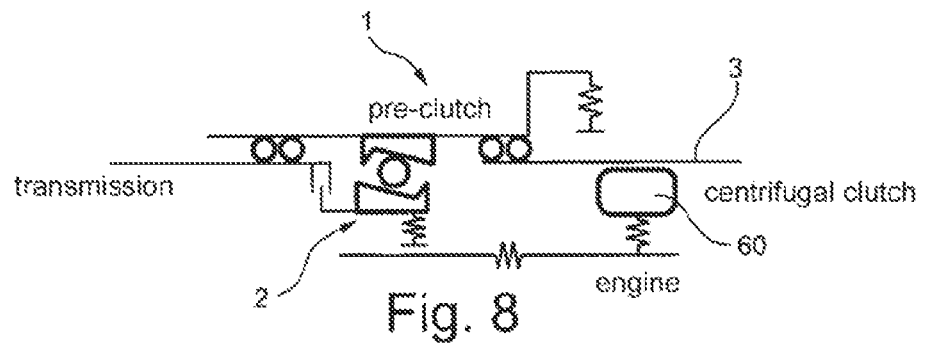
FIG. 8 is a schematic view of a clutch having a centrifugal clutch between the clutch basket of the main clutch and a cover of the pre-clutch.

FIG. 8 shows a schematic depiction of a clutch wherein the clutch basket 18 is coupled with the pilot clutch by means of a centrifugal clutch 60. The idea is that a connection between the pilot clutch and the clutch basket, which is achieved by means of a positive connection in the exemplary embodiment in FIG. 3, is represented by means of a frictional clutch 60.

Figure 9:
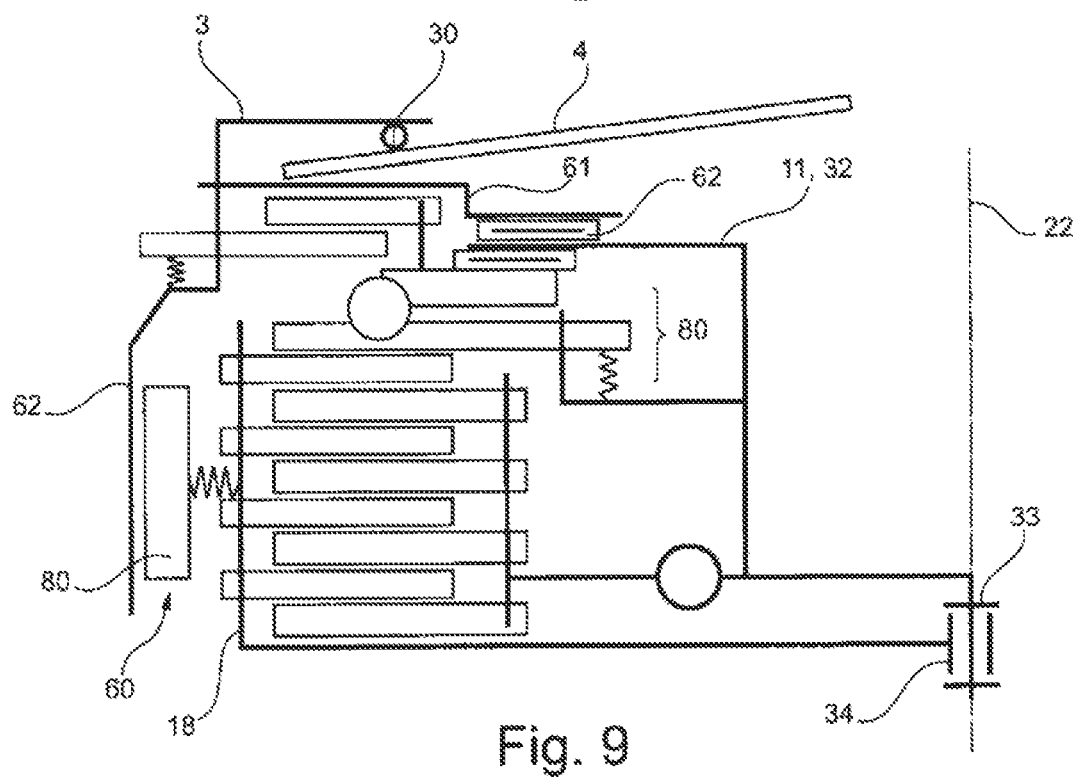
FIG. 9 is a schematic diagram of the clutch of FIG. 8 with a centrifugal clutch.

FIG. 9 shows a schematic depiction of the construction of the clutch with centrifugal clutch according to FIG. 8. In essence, the clutch is constructed according to the schematic structure of FIG. 1, but where the cover 3 is not coupled with the clutch core positively but rather by means of a centrifugal clutch 60. Furthermore, the support for the diaphragm spring 4 is supported on a supporting plate 61 of the cover 3. The supporting plate 61 is supported by means of a second bearing 62 against the core 11, in particular against the core part 32. In the outer edge zone 62 farther down the cover 3 overlaps the clutch basket 18. The centrifugal clutch is situated between the clutch basket 18 and the edge zone 62. Thereby a non-rotating connection between the cover 3 and the clutch basket 18 is not achieved until the clutch basket 18 turns. As the clutch basket 18 turns, flaps 80 of the centrifugal clutch 60 which are held on the clutch basket 18 so that they can pivot are pulled outward until they press against the inner side of the edge zone 62 of the cover 3. This produces a contact force which exerts a torque on the cover 3 which drives the cover to turn with the clutch basket 18.

Figure 10:
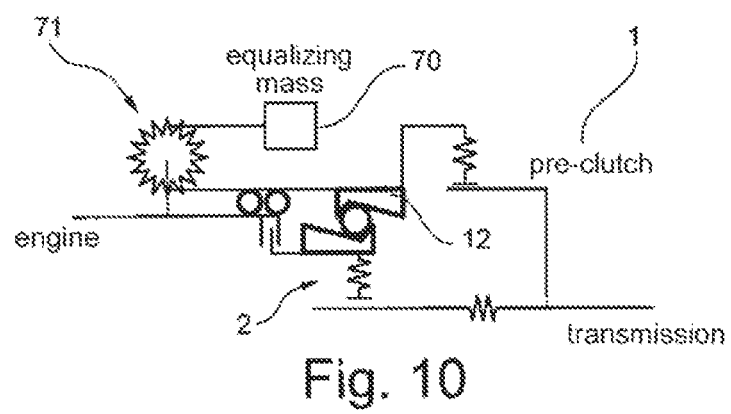
FIG. 10 is a schematic view of a clutch having an equalization mass.

FIG. 10 shows a schematic depiction of another embodiment of a clutch, wherein an equalizing mass 70 is coupled with the effective medium, i.e., a ramp of the pre-clutch 1. In the depicted exemplary embodiment, the pilot clutch is connected to an engine connection. The first ramp 12 is connected to the equalizing mass 70 by means of a connecting means 71. The connecting means is constructed in such a way that acceleration of the first ramp 12 is damped. In this way, unwanted excitation of the first ramp 12 is reduced, in particular prevented. As long as the pre-clutch is disengaged, in the depicted exemplary embodiment the pre-clutch follows the rotation of the engine drive shaft exactly. That is, the two ramps 12, 31 cannot rotate opposite each other, and thus the main clutch 2 is disengaged.

Figure 11:
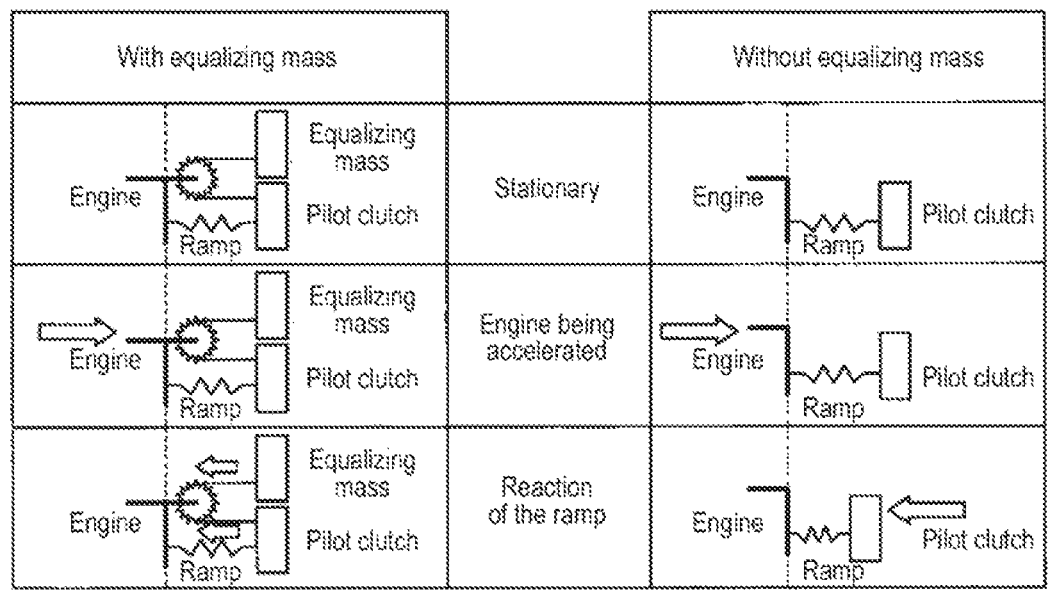
FIG. 11 is a schematic diagram illustrating the operating principle of the equalization mass.

The operating principle can be explained on the basis of FIG. 11. The two ramps can be seen as a type of spring, which connects the pre-clutch to the engine. In the system without equalizing mass 70, the acceleration of the engine produces a dynamic force. This force is transmitted to the pre-clutch by the spring (ramps). This loading tensions the spring. Thus the spring twists so that, the main clutch is engaged.

Through the provision of the equalizing mass, the dynamic force of the engine is transmitted from the first ramp 12 to the equalizing mass 70, for example by means of gears. This design prevents loading of the ramps, so that twisting of the ramps is avoided, and consequently the engagement of the main clutch is prevented.

An advantage of this arrangement thus consists in the fact that the clutch becomes less sensitive to throttle bursts. In addition, problems of catching when the vehicle or motorcycle is driven are prevented.

Figure 12:
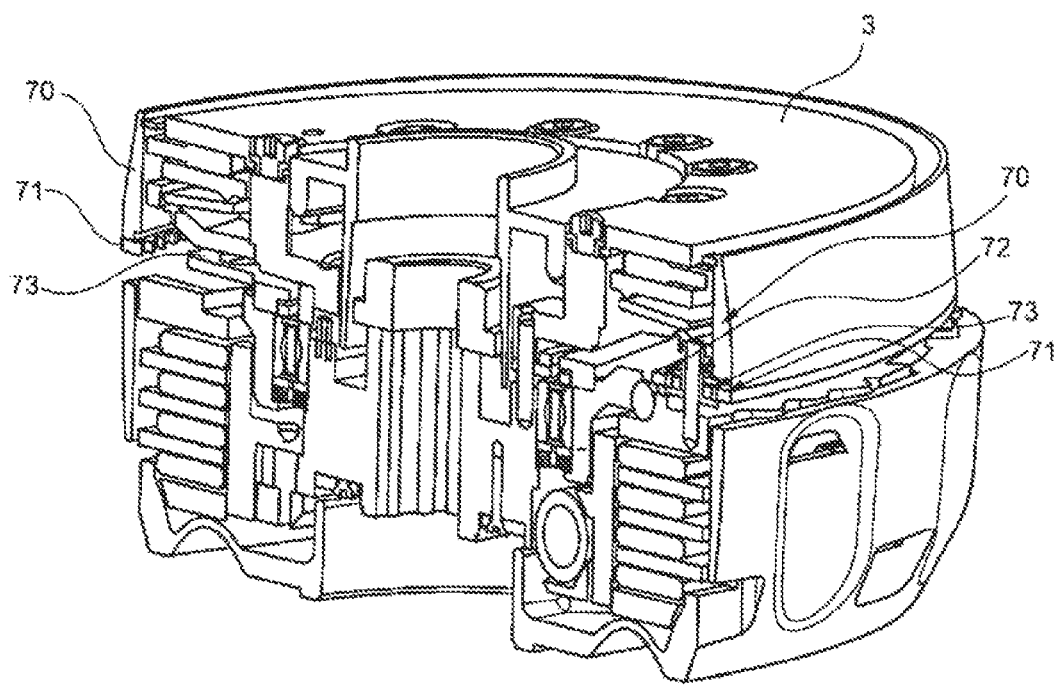
FIG. 12 is a cross section through a perspective view of the clutch having an equalization mass according to FIG. 10.

FIG. 12 shows a cross section through a perspective view of a clutch according to FIG. 10. In this embodiment, the second ramp 31 is connected to an equalizing mass 70 through a connecting means in the form of a gear ring system. The equalizing mass 70 is constructed in the form of a ring which is rotatably supported on a cover 3 of the clutch. The first ramp 12 has an outer gear ring 72 which is meshed with a gear wheel 73. The gear wheel 73 is rotatably supported in the clutch. The gear wheel is meshed with a second gear ring 71, which is formed on the inner side of the equalizing mass 70. If the first ramp 12 is now accelerated, the equalizing mass 70 is moved in the opposite direction by means of the gear system. This slows the acceleration of the second ramp ring. Instead of gear wheels, other effective mediums, for example belts, can be used to transmit the motion of the first ramp to the equalizing mass 70.

FIG. 13 shows a schematic depiction of the gear wheel 73 with the first ramp 12 and the equalizing mass 70.

FIG. 14 shows another cross section through the embodiment from FIG. 3.

Figure 15:
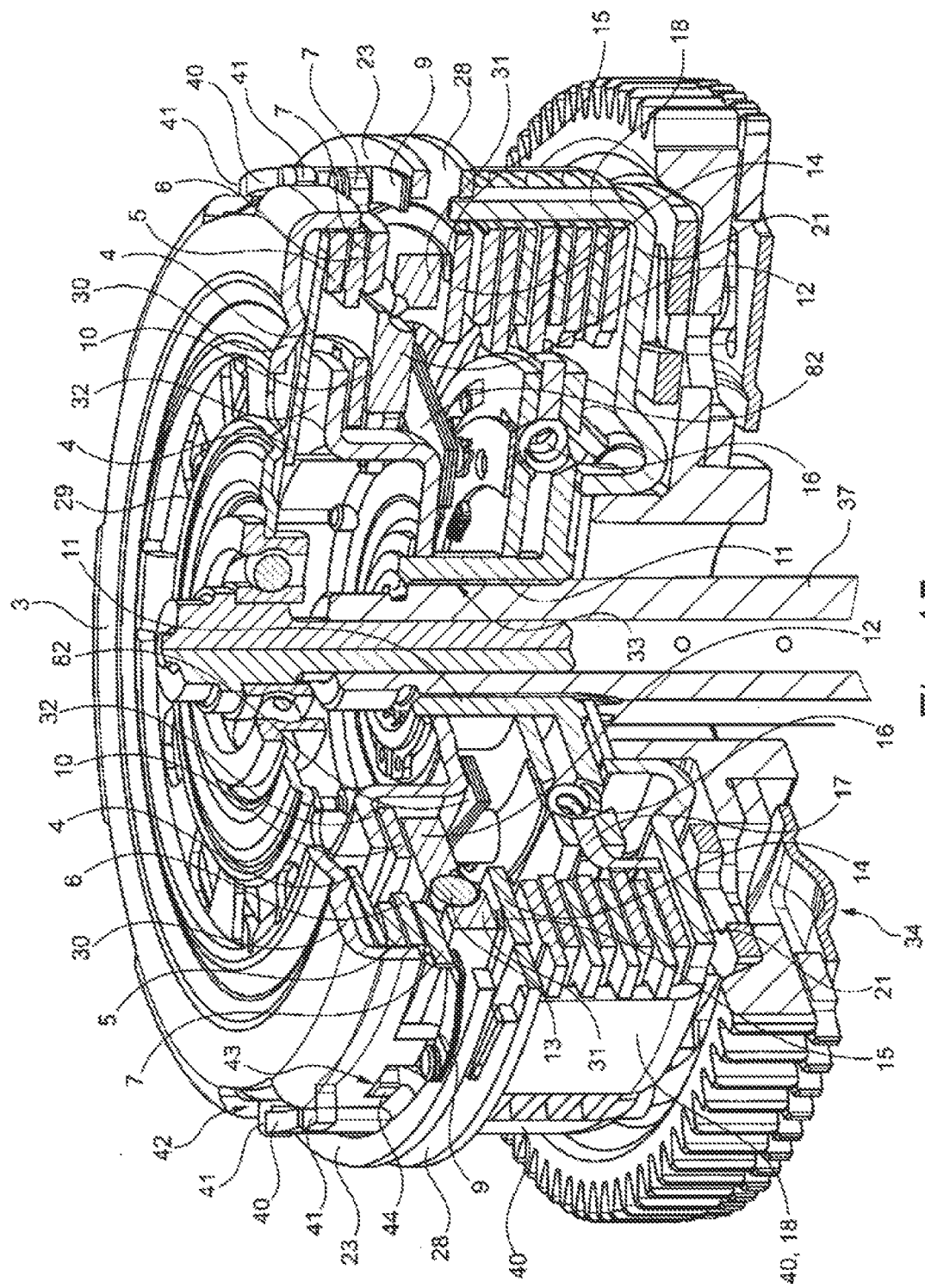
FIG. 15 is a cutaway of a perspective view of the clutch from FIG. 3.

FIG. 15 shows a perspective partial cutaway of the embodiment from FIG. 3.

REFERENCE VARIABLES

1 pre-clutch
2 main clutch
3 cover
4 diaphragm spring
5 support plate
6 plate
7 driver disk
8 connecting means
9 first spring means
10 bearing
11 core
12 first ramp
13 ball
14 pressure plate
15 second spring means
16 torque sensor
17 inner clutch basket
18 clutch basket
19 plate
20 driver disk
21 floor plate
22 center axis
23 cover rim
24 first basket flange
25 second basket flange
26 cover plate
27 bearing
28 guard ring
29 actuating ring
30 support
31 second ramp
32 core part
33 first connection
34 second connection
35 tube
37 gear shaft
38 connection region
39 bolt
40 side wall
41 webs
42 opening
43 second opening
44 cog
45 third opening
46 second cog
47 support surface
50 lateral opening
51 guide opening
52 arrow
60 centrifugal clutch
61 supporting plate
62 edge zone
70 equalizing mass
71 second gear ring
72 outer gear ring
73 gear wheel
80 effective medium
82 third spring means

What is claimed is:

1. A clutch having a cover plate (26), a pre-clutch (1) and a main clutch (2), where the pre-clutch (1) can be brought to an engaged or a disengaged state by a tensioning means (4), the pre-clutch (1) being connected to the main clutch (2) by means of an operative connection (80) in such a way that the disengaged position and the engaged position of the pre-clutch (1) are transmitted to the main clutch (2), wherein:
   the tensioning means (4) is biased between said cover plate (26) and a driver disk (7) of a clutch basket (18);
   the operative connection (80) has a ramp (12), a transmitting element (13) and a pressure plate (14);
   the ramp (12) is coupled with the pre-clutch (1);
   the pressure plate (14) is in an operative connection with the main clutch (2);
   the transmitting element (13) is situated between the ramp (12) and the pressure plate (14) to transmit power;
   the pressure plate (14) is directly connected to a clutch core (11) by spring means (82) connected to a bolt (39) of clutch core (11);
   said ramp is supported by a needle bearing (10); and,
   said spring means (82) is a leaf spring.

2. The clutch recited in claim 1, wherein another ramp (31) is provided between the transmitting element (13) and the pressure plate (14), and that additional spring means (15) are provided which pre-tension the ramps (12, 31) to each other.

3. The clutch recited in claim 1, wherein the pre-clutch (1) has a driver disk (7) and a plate (6), that the driver disk (7) is connected axially movably and non-rotatably to a clutch basket (18) of the main clutch (4), while the plate (6) is rotatably supported on the clutch core (11), the driver disk (7) being pre-tensioned by means of first spring elements (9).

4. The clutch recited in claim 3, wherein the driver disk (7) meshes with cogs (44) in openings (43) in a cover (3) of the pre-clutch (1).

5. The clutch recited in claim 1, wherein a torque sensor (16) is situated between the clutch core (11) and an inner clutch basket (17) of the main clutch.

6. The clutch recited in claim 1, wherein the main clutch (2) has the clutch basket (18), and that the clutch basket (18) is made as a punched part.

7. The clutch recited in claim 6, wherein the clutch basket (18) is surrounded by a guard ring (28), where the guard ring (28) protects the clutch basket (18) against breaking; and, wherein said guard ring is positioned within said clutch basket (18).

8. The clutch recited in claim 1, wherein tubes (35) are provided to carry oil for lubricating the clutch.

9. The clutch recited in claim 1, wherein the pre-clutch (1) and the main clutch (2) are coupled together by means of a centrifugal clutch (60).

10. The clutch recited in claim 1, wherein an equalizing mass (70) is provided which is coupled with the ramp (12) and damps acceleration of the ramp (12).

11. The clutch recited in claim 10, wherein the ramp (12) is coupled with the equalizing mass by means of a gear system (71, 72, 73).

12. A clutch having a cover plate (26), a pre-clutch (1) and a main clutch (2), where the pre-clutch (1) can be brought to an engaged or a disengaged state by a tensioning means (4), the pre-clutch (1) being connected to the main clutch (2) by means of an operative connection (80) in such a way that the disengaged position and the engaged position of the pre-clutch (1) are transmitted to the main clutch (2), wherein:
- the tensioning means (4) is biased between said cover plate (26) and a driver disk (7) of a clutch basket (18);
- the operative connection (80) has a ramp (12), a transmitting element (13) and a pressure plate (14);
- the ramp (12) is coupled with the pre-clutch (1);
- the pressure plate (14) is in an operative connection with the main clutch (2);
- the transmitting element (13) is situated between the ramp (12) and the pressure plate (14) to transmit power;
- the pressure plate (14) is directly connected to a clutch core (11) by spring means (82);
- wherein said ramp is supported by a needle bearing (10); and,
- said spring means (82) is a leaf spring;
- wherein a torque sensor (16) is situated between the clutch core (11) and an inner clutch basket (17) of the main clutch (2); and,
- wherein said torque sensor (16) is directly connected to said clutch core (11).

* * * * *